United States Patent [19]

Morris

[11] 4,098,848

[45] Jul. 4, 1978

[54] FLAME RETARDANT THERMOPLASTIC ELASTOMER

[75] Inventor: Harris L. Morris, Woodbridge, Conn.

[73] Assignee: Uniroyal, Inc., New York, N.Y.

[21] Appl. No.: 666,541

[22] Filed: Mar. 15, 1976

[51] Int. Cl.$^2$ .............................................. C08L 23/16
[52] U.S. Cl. ........................... 260/897 A; 260/45.7 R; 260/45.75 B; 260/DIG. 24
[58] Field of Search ............... 260/897 A, 45.7, 45.75, 260/DIG. 24

[56] References Cited

U.S. PATENT DOCUMENTS

| | | | |
|---|---|---|---|
| 3,668,281 | 6/1972 | Drake | 260/897 C |
| 3,806,558 | 4/1974 | Fischer | 260/897 A |
| 3,835,201 | 9/1974 | Fischer | 260/897 A |
| 3,946,897 | 3/1976 | Wolff | 260/897 A X |

OTHER PUBLICATIONS

"Polymer Additives" Noyes Data Corporation–1972, p. 247.

*Primary Examiner*—Carman J. Seccuro
*Attorney, Agent, or Firm*—James J. Long

[57] ABSTRACT

Blends of ethylene-propylene-ethylidene norbornene-type of EPDM rubber having a high ethylene content, polyolefin resin (e.g. polypropylene), dodecachloro-octahydro-dimethanodibenzocyclooctane and antimony oxide are flame retardant and have the desirable properties of a thermoplastic elastomer, especially good tensile and elongation retained over a wide range of rubber/resin ratios.

3 Claims, No Drawings

FLAME RETARDANT THERMOPLASTIC ELASTOMER

This invention relates to a flame retardant thermoplastic elastomeric composition.

Thermoplastic elastomers, also called elastoplastics, are materials which have elastomeric properties without requiring cure. They can be fabricated by rapid, economical methods usually employed in making thermoplastic articles. Because they are repeatedly reprocessable, scrap or defective articles can be recycled. Unlike an ordinary vulcanizable elastomer which does not develop elastomeric properties until it is cured, no curing step or long dwell time in a mold is necessary with thermoplastic elastomers. Because of the great advantages of thermoplastic elastomers the art is constantly searching for new and improved materials of this kind which could be made more easily or more economically, or which would give superior results.

Thermoplastic elastomers based on blends of olefin copolymer rubber (especially "EPDM", which is ethylene-propylene-non-conjugated diene terpolymer rubber) with polyolefin resin are known; see, for example, U.S. Pat. Nos. 3,758,643, Fischer, Sept. 11, 1973, 3,806,558, Fischer, Apr. 23, 1974, 3,835,201, Fischer, Sept. 10, 1974, and 3,851,411, Crosbie et al., Dec. 3, 1974. It is an object of the present invention to provide a more easily or more conveniently prepared thermoplastic elastomer of this kind which is flame retardant, and which is characterized by good physical properties over a broad range of compositional ratios, so as to be adapted to a wide variety of uses.

The present invention is based on the discovery that a flame retardant thermoplastic elastomer having good physical properties and other important advantages is provided by blending (A) an EPDM rubber of high ethylene content in which the diene is 5-ethylidene-2-norbornene with (B) a polyolefin resin, and (C) flame retardants comprising 1,2,3,4,7,8,9,10,13,13,14,14-dodecachloro-1,4,4a,-6a,7,10,10a, 12a-octahydro-1,4:7,10-dimethanodibenzocyclooctane (hereinafter called "DCCO") and antimony oxide ($Sb_2O_3$).

More particularly, in the 5-ethylidene-2-norbornene (hereinafter referred to as "ENB") type of EPDM terpolymer rubber of high ethylene content employed in the flame retardant thermoplastic elastomer of the invention, the ethylene propylene ratio is from 68/32 to 90/10, preferably from 70/30 to 85/15, and most preferably from 73/27 to 80/20, by weight. The ENB content of the EPDM is from 4 to 20%, preferably from 4 to 15%, and most preferably from 5 to 10%, by weight.

It has been found that for purposes of the invention the weight ratio of (A) EPDM rubber to (B) polyolefin resin in the thermoplastic elastomer blend should be from 50/50 to 95/5, preferably from 60/40 to 90/10, and more preferably from 70/30 to 80/20, by weight.

The desired flame retardant properties and other desired properties are obtained in the composition of the invention when the flame retardant additives (C), namely, the DCCO (meaning, as indicated previously, 1,2,3,4,7,8,9,10,13,13,14,14-dodecachloro-1,4,4a,-6a,7,10,10a,12a-octahydro-1,4: 7,10-dimethanodibenzocyclooctane) plus the the antimony oxide, are present in the composition at levels of from 80 to 120 parts, preferably from 100 to 120 parts, per 100 parts by weight of (A) EPDM plus (B) polyolefin resin. The weight ratio of DCCO to antimony oxide should be from 1/1 to 10/1, usually from 2/1 to 5/1, with best results achieved at a 3/1 to 4/1 weight ratio.

The polyolefin resin (B) with which the terpolymer rubber (A) is mixed, along with the flame retardants (C), to make the blend of the invention is a solid, high molecular weight resinous plastic material made by polymerizing such olefins as ethylene, propylene, butene-1, pentene-1, 4-methylpentene-1, etc., in conventional manner. Thus, such essentially crystalline polyolefins as polyethylene (either of the low density [e.g., 0.910–0.925 g/cc], medium density [e.g., 0.926–0.940 g/cc] or high density [e.g., 0.941–0.965 g/cc]) may be used, whether prepared by high pressure processes or low pressure processes, including linear polypropylene. Polypropylene is a preferred polyolefin plastic, having highly crystalline isotactic and syndiotactic forms. Frequently the density of polypropylene is from 0.800 to 0.980 g/cc. Largely isotactic polypropylene having a density of from 0.900 to 0.910 may be mentioned particularly. Crystalline block copolymers of ethylene and propylene (which are plastics distinguished from amorphous random ethylene-propylene elastomers) can also be used. Included among the polyolefin resins are the higher alpha-olefin modified polyethylenes and polypropylenes (see "Polyolefins", N. V. Boenig, Elsevier Publishing Co., N.Y., 1966).

To prepare the flame retardant thermoplastic elastomer blend of the invention the described ingredients are mixed together at normal mixing temperature, either in an internal mixer such as a Banbury (trademark), Braebender (trademark), or extruder mixer, or in an open mixer such as a roll mill. The blended flame retardant composition may include if desired additional conventional materials such as pigments, fillers, processing aids, stabilizers, antioxidants, etc. in accordance with common practice in preparing thermoplastic compositions. No curing agent (crosslinking agent, or vulcanizing agent) is included in the compositions which are true thermoplastics as distinguished from vulcanizing or curing compositions that become thermoset in the course of the shaping operation.

The flame retardant blends of this invention have a UL (Underwriters Laboratory) #94 flame test rating of at least VE-2, preferably VE-O, the latter being achieved with 100 parts of flame retardants (C), that is, 100 parts of DCCO plus antimony oxide, per 100 parts of rubber (A) plus resin (B), especially at a DCCO/antimony oxide ratio of 4/1.

The blends of this invention based on high ethylene content ENB type of EPDM suprisingly exhibit outstandingly good physical properties (especially tensile strength) in the presence of the specified flame retardant additives over a remarkably wide range of EPDM rubber to polyolefin resin ratios. Thus, the rubber and resin can be blended at various ratios over the wide ranges previously indicated to provide blends of various hardness, elongation, set, and other properties without loss of the important tensile and flame retardant properties. This characteristic is particularly unexpected because otherwise similar blends based on EPDM having an ethylene/propylene ratio of 67/33 or less not only have lower overall physical properties (i.e., poor tensile and elongation) but these properties deteriorate even more with increasing EPDM rubber/polyolefin resin ratio. This effect is apparent in test data obtained on extruded samples of the blends, as will be shown in the examples below. Furthermore, if the EPDM employed is based not on 5-ethylidene-2-norbornene but on another termonomer (e.g. dicyclopentadiene or 1,4-hexadiene), the blends are deficient in the foregoing respect regardless of the ethylene content of the EPDM.

Unlike certain prior thermoplastic elastomer blends based on EPDM rubber and polyolefin resin, the present flame retardant blends, based on ENB type of EPDM having high ethylene content, surprisingly do not require any partial or semi-cure, either before or during the blending. Furthermore, it is not necessary, in the present blends, to employ EPDM of extraordinarily high zero shear viscosity, as in certain previously known thermoplastic elastomers. Ordinary EPDM having a zero shear viscosity not greater than $0.5 \times 10^9$, usually not exceeding $0.3 \times 10^9$ poises (determined from zero shear creep data at 135° C), and having an intrinsic viscosity of less than 3.0 usually less than 2.5 dl/g (measured in tetralin at 135° C) is satisfactory. This rubbery polymer has no gel in boiling xylene, and the gel content in cyclohexane at room temperature is not greater than 18%, preferably not greater than 16% by weight. Accordingly, the practice of the invention is decidedly more convenient and economical than the previously proposed practices of the above-cited patents; in addition the invention provides a remarkable degree of flame retardancy, as indicated. The described advantages are enjoyed over a wide range of compositional ratios, as indicated previously, making the invention adaptable to a wide variety of diverse uses calling for different physical properties.

The blends of the invention may be used to produce thermo-formed flame retardant shaped objects (e.g., by extrusion, injection or compression molding, blow molding, calendering, vacuum forming) including insulation on wire, gaskets, flexible tubing, weatherstripping, automotive body parts such as bumpers, etc., by conventional thermoplastic shaping techniques. Unlike thermosetting compositions, such as the usual vulcanizable elastomers, no prolonged dwell time for a curing step is necessary, and therefore rapid and economical production of shaped elastomeric articles is possible. Unlike a vulcanized elastomer the present material remains thermoplastic even after the shaping step and is repeatedly reprocessable, thereby eliminating waste (non-reprocessable cured scrap) and making it possible to recycle the material repeatedly. The physical properties are surprisingly similar to those of a vulcanized elastomer, in spite of the absence of any vulcanizing step such as is necessary in a conventional rubber to develop elastomeric properties.

The following examples, in which all quantities are expressed by weight unless otherwise indicated, will serve to illustrate the practice of the invention in more detail.

EXAMPLE 1

This example illustrates the practice of the invention using terpolymers of ethylene, propylene and 5-ethylidene-2-norbornene having various E/P ratios. The polyolefin resin employed is polypropylene having a density of 0.903, a melt flow index of 4 (ASTM D123B-57T, 230° C.), and a gel content of 96% by weight in cyclohexane (48 hours at 73° F.) The polypropylene resin is an isotactic and largely crystalline material known as Profax 6523 (trademark).

80 parts of DCCO, 20 parts of antimony oxide, 75 parts of EPDM and 25 parts of polypropylene, were charged to a No. 11 Banbury mixer (total weight of charge 1500 g) at room temperature. The mixer was run at No. 2 speed until the temperature (registered by a thermocouple located in the wall of the mixing chamber) was 180° C. Mixing was continued for 5 minutes, then a mixture of 3 g magnesium oxide, 4.5 g of 3,5-di-tert-butyl-4-hydroxyhydrocinnamate methane (antioxidant Irganox 1010 [trademark]), 7.5 g of dilaurylthiodipropionate (stabilizer) and 3.75 g of 2-(3',5'-di-tert-butyl-2'-hydroxyphenyl)-5-chlorobenzotriazole (u.v. absorber Tinuvin 327 [trademark]) was charged. After 2 minutes of additional mixing the batch was dropped, sheeted out on a hot (150° C) mill and chopped into pellets.

For the purpose of determining physical properties of the blends test samples were prepared from the pellets by extruding. Blends were extruded into strips through a 1&¼ inch × 0.060 inch slit die using a 1&½ inch Davis Standard (trademark) extruding machine (Model 15T, Serial No. E. 298). The temperature profile used was 190° C (zone 1), 205° C (zone 2), 218° C (zone 3) 232° C (zone 4) and 232° C (die). A general purpose screw was used having a L/D ratio of 24/1 and a compression ratio of 2.8/1. The screw speed used was 60 rpm.

In similar manner blends of the same materials in which the EPDM/polypropylene ratio is 60/40 and 90/10 were mixed, and extruded samples were prepared for testing.

The results of the physical testing are shown in Table I, wherein the symbols have the following meanings:

| | |
|---|---|
| ENB | 5-ethylidene-2-norbornene |
| EPDM | ethylene-propylene-diene terpolymer rubber |
| DCCO | dodecachlorooctahydrodimethanodibenzocyclooctane as more fully identified previously (Dechlorane Plus 25 [trademark] |
| E/P | ethylene/propylene weight ratio |
| $I_2$ No. | iodine number |
| I.V. | intrinsic viscosity, dl/g, in tetralin at 135° C |
| PP | polypropylene resin |
| EPDM/PP | weight ratio of rubber to resin |
| Tensile | ultimate tensile strength, psi |
| Elong. | elongation at break, % |
| % change | change in tensile strength of B and C blends, based on tensile strength of A blend. |

In Table I the characteristics of the various EPDM's used are identified. It should be noted that Runs No. 1, 2, and 3 are outside the invention whereas Runs No. 4, 5 and 6 represent this invention.

The (EPDM + PP)/(DCCO + $Sb_2O_3$) ratio is 1/1 throughout at a 4/1 DCCO/$Sb_2O_3$ ratio, all by weight.

The data indicate that if the EPDM has an E/P ratio of greater than 67/33 (i.e. 68/32 or higher) the overall physical properties greatly and unexpectedly improve. In addition, as the EPDM/PP ratio is increased to a level higher than 60/40 by weight the physical properties of the blends of this invention are unexpectedly substantially maintained or even improved whereas those of the comparison examples (No. 1, 2 & 3) are considerably reduced.

All runs embodied in Table I have a flammability rating of VE-O according to UL -94 test (vertical).

TABLE I

Flame Retardant Blends of ENB Type EPDM and Polypropylene Containing 40% DCCO and 10% Antimony Oxide

| Run No.: | 1 | 2 | 3 | 4 | 5 | 6 |
|---|---|---|---|---|---|---|
| EPDM Properties | | | | | | |
| E/P ratio | 50/50 | 61/39 | 67/33 | 73/27 | 75/25 | 77/23 |
| I₂ No. | 10 | 11.5 | 10 | 11 | 15 | 13 |
| I.V. | 1.7 | 2.2 | 2.1 | 2.2 | 2.0 | 2.2 |
| Blend properties; extruded samples | | | | | | |
| A. 60/40 EPDM/PP | | | | | | |
| Tensile | 570 | 660 | 730 | 920 | 1210 | 1250 |
| Elong. | 25 | 15 | 280 | 450 | 410 | 400 |
| B. 75/25 EPDM/PP | | | | | | |
| Tensile | 260 | 370 | 470 | 820 | 1130 | 1280 |
| Elong. | 40 | 20 | 380 | 600 | 530 | 480 |
| % Change | −55 | −44 | −55 | −11 | −7 | +2 |
| C. 90/10 EPDM/PP | | | | | | |
| Tensile | 100 | 130 | 360 | 830 | 1180 | 1500 |
| Elong. | 90 | 75 | 480 | 760 | 650 | 560 |
| % Change | −85 | −80 | −51 | −10 | −2.5 | +20 |

EXAMPLE 2

Flame retardant blends were prepared using the procedure of Example 1. The EPDM employed has an E/P ratio of 75/25 (by weight) and an iodine number of 15. The blend compositions and their physical properties are listed on Table II.

The results indicate that limited acceptable flame retarding (VE-2) is achieved at a (EPDM + PP)/(DCCO - $Sb_2O_3$) ratio of 60/40 (Run No. 8), whereas at a 50/50 ratio (Run No. 9) a VE-O rating is obtained. At the same time good to satisfactory physical properties are achieved. Run No. 7 is outside this invention.

TABLE II

| Run No. | 7 | 8 | 9 |
|---|---|---|---|
| EPDM/PP | 60/40 | 60/40 | 60/40 |
| EPDM + PP, parts | 70 | 60 | 50 |
| DCCO, " | 24 | 32 | 40 |
| $Sb_2O_3$ " | 6 | 8 | 10 |
| (EPDM + PP)/FR | 70/30 | 60/40 | 50/50 |
| Extruded Properties | | | |
| Tensile strength, psi | 1330 | 1340 | 1080 |
| Elongation % | 450 | 470 | 370 |
| Flame retardancy | B | VE-2 | VE-0 |

EXAMPLE 3

This example was carried out according to the procedure of Example I in order to determine the effect of variation of the DCCO/$Sb_2O_3$ ratio. The EPDM used is the same as in Example 2, and the EPDM/PP ratio is 75/25 by weight.

Table III summarizes the compositions and the physical and flame retarding properties of the blends. The data indicate that excellent flame retardancy is achieved while retaining good physical properties.

TABLE III

| Run No. | 10 | 11 | 12 | 13 |
|---|---|---|---|---|
| EPDM + PP, parts | 50 | 50 | 50 | 50 |
| DCCO, " | 33.3 | 37.5 | 40 | 41.7 |
| $Sb_2O_3$ " | 16.7 | 12.5 | 10 | 8.3 |
| DCCO/$S_2O_3$ " | 2/1 | 3/1 | 4/1 | 5/1 |
| Extruded Properties | | | | |
| Tensile, psi | 1000 | 990 | 960 | 940 |
| Elongation, % | 560 | 540 | 550 | 550 |
| Flame retardancy | VE-0 | VE-0 | VE-0 | VE-0 |

EXAMPLE 4

Various well known flame retardant additives were evaluated in comparison to DCCO. The procedure of Example 1 was adopted for the preparation of these blends.

The EPDM employed is the same as in Example 2, the EPDM/PP ratio is 75/25 by weight throughout, and the (EPDM + PP)/total flame retardant ratio is 50/50 for each run at a 4/1 flame retardant to $Sb_2O_3$ ratio.

Table IV shows the blend compositions and the physical properties of the various flame retardant mixtures. In Table IV, "DCDN" stands for 6-(1′,4′,5′,6′,7′, 7-hexachloronorborn-5′-en-2′-yl)-1,2,3,4,10,10-hexachloro-1,4,4a,5,6,7,8,8a-octahydro-1,4:5,8-dimethanonaphthalene, while "HBBD" stands for hexabromobiphenyl. The extrudate smoothness is also listed indicating that the blend of this invention (Run No. 14) produced extrudates having good to excellent surface smoothness whereas, the comparison runs (No. 15 & 16; outside this invention) resulted in extruded compounds having unsatisfactorily rough surfaces. It should be noted that hexabromobiphenyl (see Run No. 16) is not a desirable flame retardant it is known to be a toxic substance.

TABLE IV

| Run No. | 14 | 15 | 16 |
|---|---|---|---|
| EPDM + PP, parts | 50 | 50 | 50 |
| DCCO, " | 40 | — | — |
| DCDN, " | — | 40 | — |
| HBBP, " | — | — | 40 |
| $Sb_2O_3$ " | 10 | 10 | 10 |
| Extruded Properties | | | |
| Tensile, psi | 970 | 1160 | 1350 |
| Elongation, % | 540 | 660 | 710 |
| Flame retardancy | VE-0 | VE-0 | VE-0 |
| Extrusion smoothness | G | U | U |

I claim:

1. A flame retardant thermoplastic elastomer comprising a blend of
   (A) an ethylene-propylene-5-ethylidene-2-norbornene terpolymer rubber having an ethylene/propylene weight ratio of from 70/30 to 85/15 and a 5-ethylidene-2-norbornene content of from 4 to 20% by weight,
   (B) a polyolefin resin,
   (C) 1,2,3,4,7,8,9,10,13,13,14,14-dodecachloro-1,4,4a,-6a,7,10,10a,12a-octahydro-1,4:7,10-dimethanodibenzocyclooctane, and
   (D) antimony oxide, the weight ratio of the said rubber (A) to the said resin (B) being from 50/50 to 95/5, the amount of (C) plus (D) being from 80 to 120 parts, per 100 parts by weight of (A) plus (B), and the weight ratio of (C) to (D) being from 1/1 to 10/1.

2. A flame retardant thermoplastic elastomer as in claim 1 in which (A) has a 5-ethylidene-2-norbornene content of from 4 to 15% by weight, the weight ratio of (A) to (B) is from 60/40 to 90/10, the amount of (C) plus (D) is from 100 to 120 parts, per 100 parts by weight of (A) plus (B), and the weight ratio of (C) to (D) is from 2/1 to 5/1.

3. A flame retardant thermoplastic elastomer as in claim 1 in which (A) has an ethylene/propylene weight ratio of from 73/27 to 80/20 and a 5-ethylidene-2-norbornene content of from 5 to 10% by weight, the weight ratio of (A) to (B) is from 70/30 to 80/20, the amount of (C) plus (D) is from 100 to 120 parts, per 100 parts by weight of (A) plus (B), the weight ratio of (C) to (D) is from 3/1 to 4/1, and the said blend has a UL No. 94 flame test rating of at least VE-2.

* * * * *